US008943310B2

(12) United States Patent
Bell et al.

(10) Patent No.: US 8,943,310 B2
(45) Date of Patent: Jan. 27, 2015

(54) SYSTEM AND METHOD FOR OBTAINING A DIGITAL CERTIFICATE FOR AN ENDPOINT

(75) Inventors: Robert T. Bell, Bountiful, UT (US); Douglas Q. Dexter, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 1331 days.

(21) Appl. No.: 11/042,901

(22) Filed: Jan. 25, 2005

(65) Prior Publication Data
US 2006/0174106 A1    Aug. 3, 2006

(51) Int. Cl.
H04L 29/06    (2006.01)
G06F 21/00    (2013.01)
H04L 9/32    (2006.01)

(52) U.S. Cl.
CPC ............ H04L 9/3263 (2013.01); H04L 9/3271 (2013.01); H04L 2209/76 (2013.01)
USPC .......................................... 713/156; 713/168

(58) Field of Classification Search
CPC ... H04L 63/0823; H04L 63/08; H04L 9/3263; H04L 9/3247; H04L 9/3268; G06F 21/31; G06F 21/33
See application file for complete search history.

(56) References Cited

U.S. PATENT DOCUMENTS

| 5,841,865 | A | 11/1998 | Sudia |
| 6,192,130 | B1 | 2/2001 | Otway |
| 6,233,341 | B1 * | 5/2001 | Riggins .......................... 380/277 |
| 6,381,698 | B1 | 4/2002 | Devanbu et al. |
| 6,516,316 | B1 * | 2/2003 | Ramasubramani et al. ...... 707/9 |
| 6,769,000 | B1 | 7/2004 | Akhtar et al. .................. 707/103 |
| 6,789,194 | B1 | 9/2004 | Lapstun et al. ................ 713/176 |
| 6,792,165 | B1 | 9/2004 | Silverbrook et al. .......... 382/314 |
| 6,795,593 | B2 | 9/2004 | Silverbrook et al. .......... 382/313 |
| 6,813,039 | B1 | 11/2004 | Silverbrook et al. ......... 358/1.18 |
| 6,816,871 | B2 | 11/2004 | Lee ............................ 707/104.1 |
| 6,816,900 | B1 | 11/2004 | Vogel et al. |
| 6,822,639 | B1 | 11/2004 | Silverbrook et al. .......... 345/173 |
| 6,980,660 | B1 * | 12/2005 | Hind et al. ..................... 380/282 |
| 6,981,147 | B1 | 12/2005 | Hamann et al. |
| 6,996,841 | B2 * | 2/2006 | Kadyk et al. ..................... 726/12 |
| 7,028,180 | B1 | 4/2006 | Aull et al. |
| 7,143,165 | B2 | 11/2006 | Vogel et al. |

(Continued)

FOREIGN PATENT DOCUMENTS

WO    WO03007203    1/2003

OTHER PUBLICATIONS

U.S. Patent Application entitled "System and Method for Installing Trust Anchors in an Endpoint", filed on Jan. 25, 2005, 31 pages.

(Continued)

Primary Examiner — Izunna Okeke
(74) Attorney, Agent, or Firm — Baker Botts L.L.P.

(57) ABSTRACT

According to one embodiment of the present invention, a method of establishing a digital certificate on an endpoint includes establishing a connection between a proxy function module and the endpoint. The proxy function module is remotely located from the endpoint and operable to communicate with the endpoint and a certificate authority. Authentication information is generated at the endpoint. A portion of the authentication information is transmitted to the proxy function module. The proxy function module obtains a digital certificate based on the portion of the authentication information. The digital certificate is received at the endpoint from the proxy function module.

22 Claims, 2 Drawing Sheets

(56) References Cited

U.S. PATENT DOCUMENTS

| | | | |
|---|---|---|---|
| 2002/0056747 | A1 | 5/2002 | Matsuyama et al. |
| 2002/0166049 | A1 | 11/2002 | Sinn |
| 2003/0130947 | A1 | 7/2003 | Benantar |
| 2003/0159054 | A1* | 8/2003 | Fauble et al. .................. 713/189 |
| 2003/0196084 | A1* | 10/2003 | Okereke et al. ................ 713/156 |
| 2004/0005051 | A1* | 1/2004 | Wheeler et al. .................. 380/28 |
| 2004/0181469 | A1 | 9/2004 | Saeki |
| 2004/0193872 | A1 | 9/2004 | Saarepera et al. |
| 2005/0005097 | A1* | 1/2005 | Murakawa ..................... 713/156 |
| 2005/0033957 | A1 | 2/2005 | Enokida |
| 2005/0076198 | A1* | 4/2005 | Skomra et al. ................. 713/156 |
| 2005/0160259 | A1* | 7/2005 | Ogura et al. ................... 713/156 |

OTHER PUBLICATIONS

Network Associates, Inc., "An Introduction to Cryptography", Copyright 1990-1999, cover pages, Table of Contents, pp. 11-84 and Index pages.

U.S. Patent and Trademark Office, Office Action for U.S. Appl. No. 11/042,618, filed Jan. 25, 2005, Robert T. Bell et al., Electronically Mailed Mar. 7, 2008.

U.S. Patent and Trademark Office, Final Office Action for U.S. Appl. No. 11/042,618, filed Jan. 25, 2005, Robert T. Bell et al., Electronically Mailed Jul. 18, 2008.

U.S. Patent and Trademark Office, Advisory Action for U.S. Appl. No. 11/042,618, filed Jan. 25, 2005, Robert T. Bell et al., Electronically Mailed Sep. 24, 2008.

U.S. Patent and Trademark Office, Final Office Action for U.S. Appl. No. 11/042,618, filed Jan. 25, 2005, Robert T. Bell et al., Electronically Mailed Dec. 26, 2008.

U.S. Patent and Trademark Office, Advisory Action for U.S. Appl. No. 11/042,618, filed Jan. 25, 2005, Robert T. Bell et al., Electronically Mailed Feb. 10, 2009.

U.S. Patent and Trademark Office, Office Action for U.S. Appl. No. 11/042,618, filed Jan. 25, 2005, Robert T. Bell et al., Electronically Mailed Jun. 30, 2009.

U.S. Patent and Trademark Office, Office Action for U.S. Appl. No. 11/042,618, filed Jan. 25, 2005, Robert T. Bell et al., Electronically Mailed Dec. 1, 2009.

U.S. Patent and Trademark Office, Final Office Action for U.S. Appl. No. 11/042,618, filed Jan. 25, 2005, Robert T. Bell et al., Electronically Mailed Apr. 13, 2010.

* cited by examiner

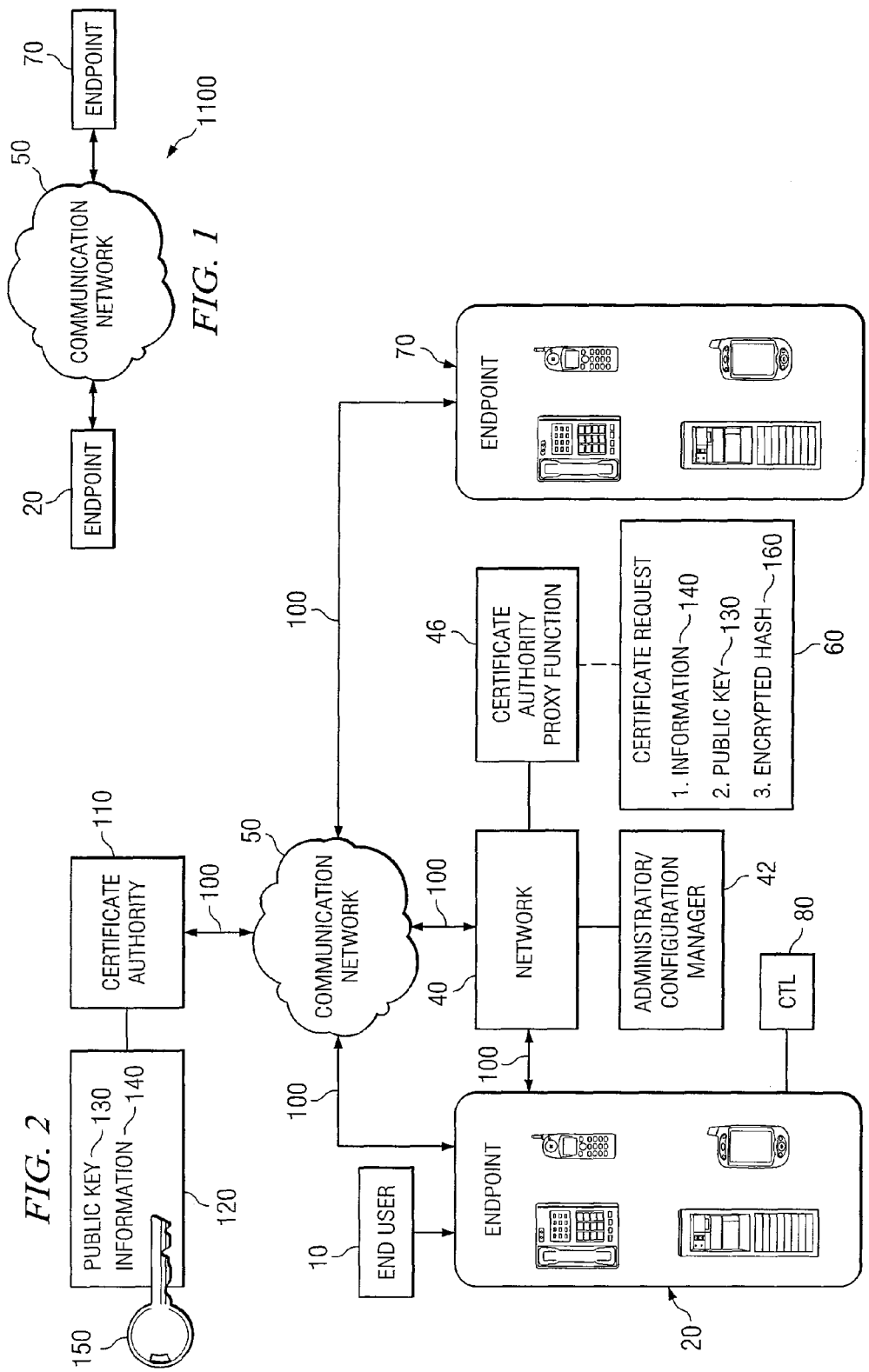

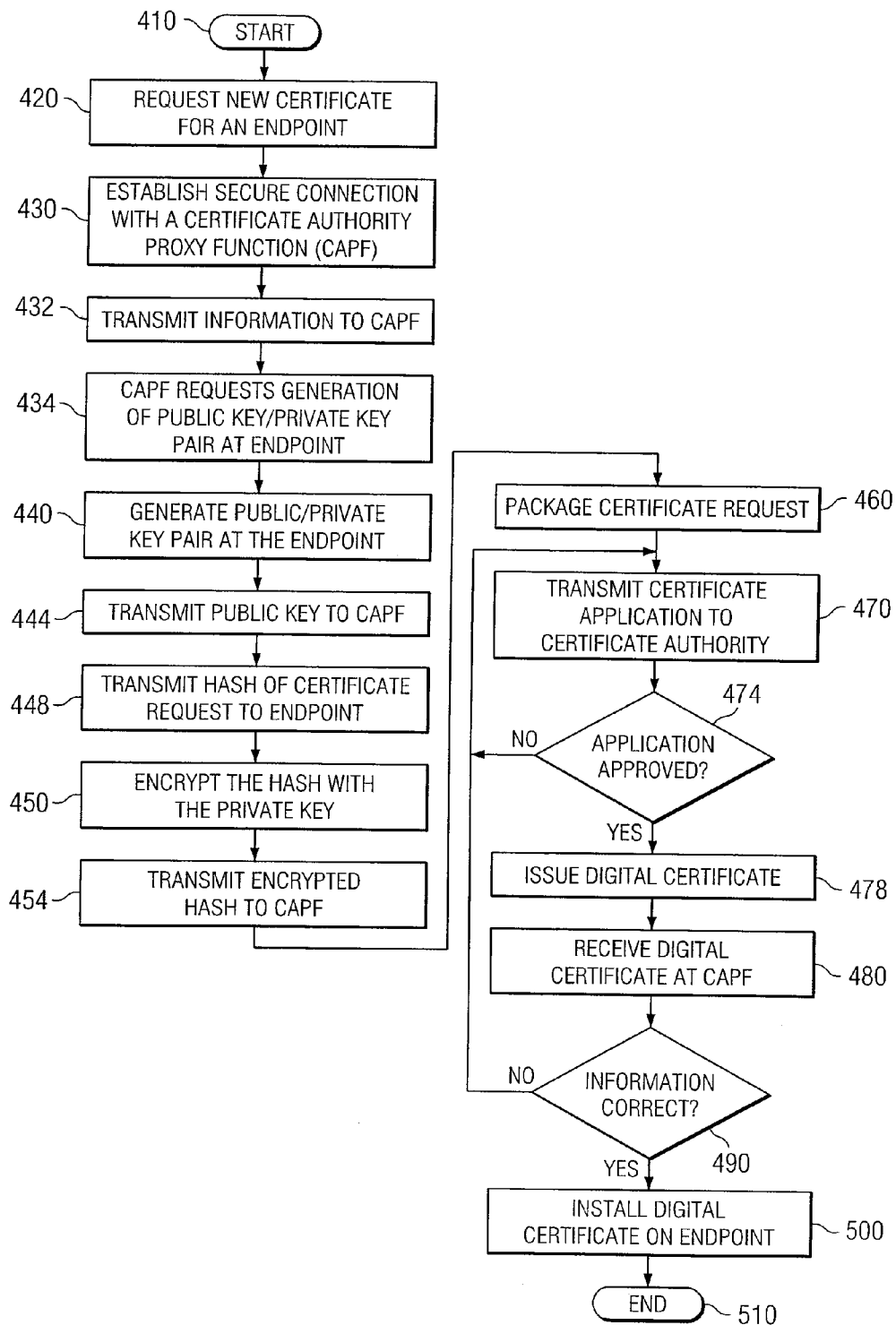

SYSTEM AND METHOD FOR OBTAINING A DIGITAL CERTIFICATE FOR AN ENDPOINT

TECHNICAL FIELD OF THE INVENTION

This invention relates in general to the field of communications and, more particularly, to a system and method for obtaining a digital certificates for an endpoint.

BACKGROUND OF THE INVENTION

Public key encryption (PKE) is an asymmetric form of encryption that utilizes two keys for each endpoint, a public key and a private key. The private key is kept private by the endpoint, while the complementary public key is made publicly available. Information encrypted with a public key can be unencrypted with a private key, and information encrypted with a private key can be unencrypted with a public key. The public key infrastructure (PKI) uses public key encryption to provide authentication of endpoints.

Information may be encrypted with a first endpoint's private key and transmitted to a second endpoint. The second endpoint uses the first endpoint's complementary public key to decrypt the encrypted information thereby authenticating the first endpoint. The second endpoint can also encrypt information with the second entity's private key, and the first endpoint can decrypt the encrypted information with second entity's public key in order to authenticate the second endpoint.

SUMMARY OF THE INVENTION

According to one embodiment of the present invention, a method of establishing a digital certificate on an endpoint includes establishing a connection between a proxy function module and the endpoint. The proxy function module is remotely located from the endpoint and operable to communicate with the endpoint and a certificate authority. Authentication information is generated at the endpoint. A portion of the authentication information is transmitted to the proxy function module. The proxy function module obtains a digital certificate from the certificate authority based on the portion of the authentication information. The digital certificate is received at the endpoint from the proxy function module.

According to another embodiment of the invention, a system for establishing a digital certificate on an endpoint is provided. The system includes an endpoint and a proxy function module in communication with the endpoint. The endpoint comprises logic encoded in media operable to generate authentication information and transmit at least a portion of the authentication information to the proxy function module. The proxy function module comprises logic encoded in media operable to receive the at least a portion of authentication information, package the at least a portion of the authentication information in a certificate request, transmit the certificate request to a certificate authority, receive the digital certificate, and transmit the digital certificate to the endpoint.

Certain embodiments of the present invention may provide a number of technical advantages. For example, a technical advantage of one embodiment may include the capability to transfer the processing functionality to request a digital certificate from an endpoint to a certificate authority proxy function module. Other technical advantages of other embodiments may include the capability to maintain a private key at an endpoint while a certificate authority proxy function module requests a digital certificate on behalf of the endpoint.

While specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communication system for communication between two endpoints;

FIG. 2 is a simplified block diagram of a communication system for obtaining a digital certificate for an endpoint in accordance with one embodiment of the present invention; and FIG. 3 is a flowchart illustrating a series of example steps associated with a method for obtaining a digital certificate for an endpoint in accordance with one embodiment of the present invention.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

FIG. 1 is a simplified block diagram illustrative of a communication system 1100 that can be utilized to facilitate communication between an endpoint 20 and an endpoint 70 through a communication network 50. As used herein, "endpoint" may generally refer to any object, device, software, or any combination of the preceding that is generally operable to communicate with another endpoint. As an example, an endpoint may represent a user, which in turn may refer to a user profile representing a person. The user profile may comprise, for example, an address for the user, a user passcode, a user name, other user information, or any combination of the preceding.

As another example, an endpoint may represent a device that comprises any hardware, software, firmware, or combination thereof operable to communicate through the communication network 50. Examples of an endpoint include, but are not necessarily limited to, a computer, a switch, a personal digital assistant, a cellular telephone, or any other device or component of such device suitable for communicating information to and from the communication network 50. Endpoints may support Internet Protocol (IP) or other suitable communication protocols. Endpoints may additionally include a medium access control (MAC) and a physical layer (PHY) interface that conforms to IEEE 801.11. A device may have a device identifier such as the MAC address and may have a device profile that describes the device.

The communication network 50 may comprise all or a portion of a public switched telephone network (PSTN); a public or private data network; a local area network (LAN); a metropolitan area network (MAN); a wide area network (WAN); a global computer network such as the Internet; a wireline or wireless network; a local, regional, or global communication network; an enterprise intranet; other suitable communication links; or any combination of the preceding.

Authenticated communication can generally be established between endpoint 20 and endpoint 70 utilizing public key encryption. For example, endpoint 20 can encrypt or "digitally sign" information with a private key and transport the encrypted information to endpoint 70. Endpoint 70 can then decrypt or authenticate the information using a public key complementary to the private key that digitally signed the information. Endpoint 70 can reciprocally transport information back to endpoint 20 using a private key of the endpoint 70.

The term "digital signature", along with any variations thereof, may refer to any piece of data or information that can be authenticated with another piece of data or information. Encryption of information and the associated decryption of the information are but one process of authenticating information. While examples of a digital signature will be given herein with reference to a piece of information being digitally signed with a private key and then being authenticated with a public key, it should be expressly understood that a variety of other technologies, techniques, and processes may be utilized, including not only those that are now known, but also those that will be later developed. Examples include any suitable challenge-response systems and techniques. Embodiments of the invention, herein, are not intended as being limited to any one digital signature, authentication scheme, or both. Accordingly, references to private keys and public keys are intended as only being illustrative of one technique that can be utilized.

Difficulties in communication can arise when one endpoint falsely poses as other another endpoint by posting phony information in what is known as a man in the middle attack. As a simple example, a second endpoint may falsely pose as an online bank and request a first endpoint to log on or to send information encrypted with the first endpoint's private key. The first endpoint can unintentionally send encrypted information to the wrong second endpoint.

Digital certificates may be utilized to certify credentials associated with a public key in order to thwart such attacks. The term "digital certificate" may refer to a piece of data or information that has been "digitally signed"—signed by, for example, a certificate authority. Prior to issuing a digital certificate, a certificate authority typically (1) verifies an identity of an endpoint, and (2) verifies that the endpoint is in possession of a particular private key. A digital certificate typically includes the public key of the verified endpoint. Other information about the endpoint may also be included. The information is encrypted (e.g., "digitally signed") with the certificate authority's private key. The signed digital certificate (1) serves as proof of possession of a private key, and (2) operates to bind certain information (for example, identity) to a particular endpoint.

An endpoint may verify credentials of another endpoint by authenticating the digital signature of a digital certificate sent by the other endpoint with the certificate authority's public key. For example, a first endpoint may receive a digital certificate from a second endpoint. The first endpoint may authenticate the digital signature by decrypting the information within the digital certificate utilizing the pubic key of the certificate authority. Accordingly, endpoints can establish authenticated communication with one another by exchanging digital certificates.

To obtain a digital certificate issued by a certificate authority, the endpoint 20 communicates with the certificate authority. The endpoint 20 may submit a digital certificate request and/or comply with certain protocols required by the certificate authority. Difficulties can arise in establishing such communications due to a limited amount of resources that are available at some endpoints. For example, the endpoint 20 may only allot resources that allow the endpoint 20 to communicate with other endpoints but not with a certificate authority. A method to overcome this difficulty involves creating a private/public key pair separate from the endpoint 20 and then installing the private key on the endpoint 20 from a central location. This method, however, can pose significant security risks by having the private key of the endpoint 20 at a location separate from the endpoint 20 for a period of time.

Another difficulty that arises in such communications involves the fact that the endpoint 20 may not be designed to communicate utilizing the protocols required by the certificate authority. Additionally, such protocols can vary from certificate authority to certificate authority and/or change with time. A method to overcome this difficulty involves loading special software on the endpoint 20 to facilitate protocol handling. However, this software unfortunately can consume the majority of the resources on the endpoint 20 and can potentially make the endpoint 20 unsuitable for its intended purposes.

Embodiments of the invention are directed towards obtaining a digital certificate for an endpoint 20 in a manner that minimizes the amount of resources required by the endpoint 20 and maintains security of the endpoint 20 by keeping a private key of the endpoint 20 on the endpoint 20. Additionally, embodiments of the invention are directed towards facilitating communication with a plurality of protocols that may be required by certificate authorities during requests for digital certificates.

As used in this document, "each" may refer to each member of a set or each member of a subset of a set.

FIG. 2 is a simplified block diagram illustrating a communication system 1000 that can be utilized, according to an embodiment of the invention, for obtaining a digital certificate 120 for the endpoint 20. The communication system 1000 can generally include the endpoint 20, a local network 40, the communication network 50, a certificate authority 110, and the endpoint 70 coupled as shown. The communication system 1000 generally connects several components with connections 100. The connections 100 can be any type of connection 100 either now known or later developed that is generally operable to facilitate communication. Examples of connections 100, include, but are not necessarily limited to, wireline and wireless connections.

The general architectural configuration of the communication system 1000 may be varied significantly, or alternatively substituted with any suitable networking components or elements that operate to provide a communicative platform. Further, although specific networking components are shown in the embodiment of FIG. 2, other embodiments may only utilize some or none of the networking components shown herein.

The endpoint 20, 70 as referenced above can generally be any object, device, or software that is generally operable to facilitate communications. For purposes of illustration, examples of endpoint 20, 70 are shown as a phone, a mobile phone, a personal digital assistant, and a server. An end user 10 can access some, but not necessarily all, types of the endpoints 20.

The endpoint 20 is generally operable to communicate with endpoint 70. Several methods of establishing communications between the endpoint 20 and the endpoint 70 can be utilized. As a basic example, intended for illustrative purposes only, the endpoint 20 and the endpoint 70 can exchange digital certificates 120 signed with a private key 150 of the certificate authority 110 or the private key of another certificate authority. With such a process, each endpoint (the endpoint 20 and the other endpoint 70) can have knowledge of information about the other endpoint. To facilitate this exchange any of a variety of different exchange processes can be utilized.

The endpoint 20 can generally includes a certificate trust list (CTL) 80, associated therewith. The certificate trust list 80 contains a listing of public keys that correspond to a trusted endpoint. For example, such public keys can correspond to endpoints such as the certificate authority 110 or an administrator/configuration manager 42, associated with the local network 40.

The local network 40 can generally represent a series of points or nodes of interconnected communication paths for receiving and transmitting information that propagates through communication system 1000. The local network 40 may be operable to facilitate a communication between the administrator/configuration manager 42 and the endpoint 20 or a certificate authority proxy function module 46 and the endpoint 20. The local network 40 and the communication network 50, alone or in combination with one another, may be any local area network (LAN), wireless local area network (WLAN), metropolitan area network (MAN), virtual private network (VPN), wide area network (WAN), or any other suitable architecture or system that facilitates communications. In one example, the local network 40 and the communication network 50 may implement an Internet Protocol (IP) communication configuration, whereby a user datagram protocol/Internet protocol (UDP/IP) language is provided. Other embodiments could include TCP, xxx/IP, or any other suitable transport, platform, or mechanism.

The administrator/configuration manager 42 and certificate authority proxy function module 46 are generally associated with the local network 40 and can generally communicate with the endpoint 20. The administrator/configuration manager 42 can generally be operable, among other items, to issue instructions to the endpoint 20 and monitor the status of the various parameters of the endpoint 20, including whether or not the endpoint 20 has an up-to-date digital certificate. Further details of the administrator/configuration manager 42 will be described below.

In this embodiment, the certificate authority proxy function module 46 serves as an agent for the endpoint 20, operable to obtain a digital certificate 120 on behalf of the endpoint 20. According to the embodiment, the certificate authority proxy function module 46 handles the communication with the certificate authority 110, which may reduce processing by the endpoint 20. As an example, the certificate authority proxy function module 46 can generally create a certificate request 60 that can includes items such as, but not necessarily limited to, information 140 that includes the identity of endpoint 20, a public key 130 of the endpoint 20, and an encrypted hash 160 that has been encrypted with a private key of the endpoint 20. The certificate authority proxy function module 46 submits the certificate request 60 to the certificate authority 110 in anticipation of receiving a digital certificate 120 for the endpoint 20. As the certificate authority proxy function module 46 communicates with the certificate authority 110, any updates or variations in communication protocols with the certificate authority 110 can be handled by the certificate authority proxy function module 46. While only one certificate authority proxy function module 46 is shown in FIG. 2, other embodiments may include more than one certificate authority proxy function module 46. More details of the certificate authority proxy function module 46 and its interaction with other endpoints are described below.

The certificate authority 110 can be a commercially known certificate authority such as VeriSign, Inc. Alternatively, the certificate authority 110 can be a local certificate authority that issues digital certificates 120 for a certain entity or organization. The certificate authority 110 in issuing a digital certificate 120 can engage in a variety of different tasks, dependent on the particular certificate authority 110. Typical tasks of certificate authorities are reviewing certificate request 60 and issuing certificates 120. In the review process, the certificate authority as referenced above can (1) verify the identity of a particular endpoint, and (2) verify that the endpoint is in possession of a particular private key. In one embodiment, the endpoint 20 may be verified as having a private key by reviewing an encrypted hash that has been encrypted with the private key of the endpoint 20. Such a process will be recognized by one of ordinary skill in the art. Other methods of establishing possession of a private key by an endpoint 20 can additionally be utilized, including not only those that are now known, but also those that will be later developed.

The issued digital certificate 120 includes the public key 130 of the endpoint 20 and information 140 pertaining to the endpoint 20, digitally signed with the private key 150 of the certificate authority 110. While the digital certificate 120 has been described with certain contents in this embodiment, other embodiments may have digital certificates 120 with other contents for example, more, fewer, or other items than that discussed above. Additionally, in some embodiments the digital certificate 120 may be digitally signed by more than one certificate authority 110.

Modifications, additions, or omissions may be made to systems 1000, 1100 of FIGS. 1 and 2 without departing from the scope of the invention. The components of the systems 1000, 1100 may be integrated or separated according to particular needs. Moreover, the operations of the systems 1000, 1100 may be performed by more, fewer, or other modules. Additionally, operations of systems 1000, 1100 may be performed using any suitable logic comprising software, hardware, other logic, or any suitable combination of the preceding.

FIG. 3 is a flowchart illustrating a series of example steps associated with a method for installing a digital certificate 120 on the endpoint 20 in accordance with one embodiment of the invention. With description of these example steps, reference is also made to the communication system 1000 of FIG. 2.

The process 400 begins at step 410. A new digital certificate on the endpoint 20 is requested at step 420. A new digital certificate may be requested for any suitable reason. For example, a previous digital certificate may have expired, no previous digital certificate may have existed, a current digital certificate may simply be a temporary certificate, or a current digital certificate may be a locally significant certificate and another type of digital certificate (e.g., a digital certificate 120 issued by a certificate authority 110) is desired.

In some embodiments, the request may begin with the administrator/configuration manager 42 sending a configuration file to the endpoint 20. The configuration file transmitted to the endpoint 20 may be digitally signed with a private key of the administrator/configuration manager 42. The endpoint 20 may authenticate the digital signature of the administrator/configuration manager 46 with the public keys on the certificate trust list 80.

Upon authentication, the configuration file can be parsed to find information indicating (1) that the endpoint 20 needs to obtain a new digital certificate, and (2) the location or address that the endpoint 20 may use to obtain the new digital certificate. The location information may, for example, be a file location or an IP address that references the location of the certificate authority proxy function module 46.

In some embodiments, the administrator/configuration manager 42 can query information concerning endpoints 20 to determine if the digital certificates pertaining to the endpoints 20 are up-to-date. Upon recognizing that the digital certificate of an endpoint 20 is out-of-date, the administrator/configuration manager 42 may transmit a configuration file to the endpoint 20 requesting that the endpoint 20 update its digital certificate. In yet other embodiments, the request for a new digital certificate on the endpoint 20 can be initiated at the endpoint 20.

The endpoint 20 establishes a connection with the certificate authority proxy function module 46 at step 430. The connection may comprise a transparent LAN service (TLS) connection. In some embodiments, the certificate authority proxy function module 46 is located on the local network 40. In other embodiments, the endpoint 20 can communicate with the certificate authority proxy function module 46 through the communication network 50.

In establishing the connection, the certificate authority proxy function module 46 can send its authentication information to the endpoint 20. The information may be digitally signed with a private key of the certificate authority proxy function module 46. The endpoint 20, upon receipt of this information checks the certificate trust list 80 for authentication. In some embodiments, the certificate authority proxy function module 46 can send a reciprocal authentication challenge back to the endpoint 20. The endpoint 20 can respond to the challenge in any suitable manner. For example, the endpoint 20 may utilize one or more of the following authentication schemes, including, but not limited to, a locally significant certificate, a manufacture installed certificate, an authentication string, or a null string. The locally significant certificate and the manufacture installed certificate can be either temporary certificates or initial certificates where a different type of certificate (e.g., a digital certificate 120 issued by a certificate authority 110) is requested. When an authentication scheme is utilized, the certificate authority proxy function module 46 can generate such an authentication string. The authentication string is then transmitted to an administrator, who may print out the authentication string and manually input the string at the endpoint 20. The null string may utilize no authentication.

In other embodiments, other authentications schemes can be utilized. For example, if multiple endpoints 20 need new certificates, the administrator/configuration manager 42 can be granted privileges to authenticate with the certificate authority proxy function module 46 on behalf of the endpoints 20.

After both parties are authenticated, a trusted connection is established. The endpoint 20 may then transmit information 140 to the certificate authority proxy function module 46 at step 432. Among other items, the information 140 may include the identity of the endpoint 20 and any other suitable items necessary for a certificate request 60. The certificate authority proxy function module 46 may then request the endpoint 20 to generate a new public key/private key pair at step 434.

The endpoint 20 generates a private key/public key pair at step 440. A variety of methods can be utilized to accomplish such a task, including but not necessarily limited to the Rivest, Shamis, Adelman, (RSA) and Diffie Hellman (DH) algorithms. The certificate authority proxy function module 46 can begin preparation of the certificate request 60 during generation of the key pair, for example, utilizing the information 140 already transmitted to the to the certificate authority proxy function module 46. The certificate request 60 may conform to the particular standards and protocols required by the certificate authority 110 to which the certificate request 60 will be sent.

Once the public/private key pair is generated, the endpoint 20 sends the public key 130 to the certificate authority proxy function module 46 at step 444. The certificate authority proxy function module 46 sends a hash value of a certificate request 60 to the endpoint 20 at step 448, and requests the endpoint 20 to encrypt the hash value as proof of possession of the private key. The endpoint 20 encrypts the hash value at step 450, and transmits the encrypted hash 160 back to the certificate authority proxy function module 46 at step 454. The certificate authority proxy function module 46 packages up the encrypted hash 160, the public key 130, and the information 140 in the certificate request 60 at step 460.

The certificate request 60 is transmitted to the certificate authority 110 at step 470 with a request that the certificate authority 110 issue a digital certificate 120. The certificate authority 110 reviews the certificate request 60 at step 474. If the application is rejected, the certificate authority 110 can issue an error message back to the certificate authority proxy function module 46. The certificate authority proxy function module 46 can handle the error message, make any necessary corrections, and loop back to step 470 to retransmit the certificate request 60 back to the certificate authority 110. If the certificate request 60 is approved, the certificate authority 110 issues a digital certificate 120 at step 478. The digital certificate 120 includes the public key 130 and information 140 of the endpoint 20, and is digitally signed with a private key 150 of the certificate authority 110.

The digital certificate authority proxy function module 46 receives the digital certificate 120 from the certificate authority 110 at step 480. The certificate authority proxy function module 46 runs a verification procedure at step 490 to check the information contained in the digital certificate 120. Such values can include, but are not necessarily limited to time values, date ranges, and the like. If the values are incorrect, the certificate authority proxy function module 46 may loop back to step 470 transmitting the certificate request 60 back to the certificate authority 110 and requesting that the errors be corrected. If the values are correct, the certificate authority proxy function module 46 transmits the digital certificate 120 to the endpoint 20 and requests the endpoint 20 to install the digital certificate 120.

Upon successful installation, the endpoint 20 can transmit information back to the certificate authority proxy function module 46, indicating that installation was successful, ending the process at step 510. Information, corresponding to successfully installed digital certificates 120 can be stored in a database (not explicitly shown, but generally associated with the local network 40), accessible by the certificate authority proxy function module 46 and the administrator/configuration manager 42. Such information can include data such as (1) when the digital certificates 120 were issued and (2) when they expire. One advantage of storing such information is that when a particular digital certificate 120 expires, the administrator/configuration manager 42 can send another request to the endpoint to seek a new digital certificate.

In accomplishing the above steps, any of a variety of different logic encoded in media can be utilized. The logic can take the form of hardware, software, firmware or any combination thereof.

As can be seen above with reference to FIG. 2 and FIG. 3, the communication of the certificate authority proxy function module 46 with the certificate authority 110 can provide a myriad of benefits to the endpoint 20. The endpoint 20 need not know all the various communication protocols that may be necessary to communicate with the certificate authority 110. The endpoint 20 only needs to communicate with the certificate authority proxy function module 46. Accordingly, a small simple protocol handler can be installed in the endpoint 20 to allow communication with the certificate authority proxy function module 46. Other than communicating with the certificate authority proxy function module 46, in some embodiments the only processing engaged by an endpoint in obtaining a new digital certificate 120 is (1) the generation of a public key/private key pair and (2) the encryption of a hash with the private key.

The utilization of the certificate authority proxy function module 46 in some embodiments centralizes an access point for the endpoints 20 to obtain a digital certificate 120. With this access point, the certificate authority proxy function module 46 helps to protect the endpoints 20 by keeping the private key of the endpoint 20 on the endpoint 20. Additionally, the certificate authority proxy function module 46 in containing the bulk of the coding and/or processing involved with requests for digital certificates 120, reduces processing required by the endpoints 20. Furthermore, any communication updates that need to be made in requests for digital certificates 120 (e.g., changes to a particular protocol for requests) can be made at the certificate authority proxy function module 46. Additionally, the certificate authority proxy function module 46, being specifically designed to communicate with certificate authorities 120, can establish significant security relationships that would be difficult directly with the endpoint 20, e.g., establishing a VPN connection with a remote certificate authority 110.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A method of establishing a digital certificate on an endpoint, the method comprising:
    establishing a connection between a proxy function module and the endpoint, the proxy function module remotely located from the endpoint, and the proxy function module operable to communicate with the endpoint and a certificate authority, wherein the establishing the connection between the proxy function module and the endpoint further comprises authenticating the proxy function module by:
        generating digitally signed information at the proxy function module,
        communicating the digitally signed information to the endpoint, and
        authenticating the digitally signed information at the endpoint;
    generating certification information at the endpoint;
    transmitting at least a portion of the certification information to the proxy function module, the proxy function module operable to package the at least the portion of certification information in a certificate request and operable to obtain a digital certificate from a certificate authority based on the certificate request;
    receiving the digital certificate at the endpoint from the proxy function module; and
    transmitting a request to the proxy function module to obtain an updated digital certificate, the proxy function module operable to package the at least the portion of certification information in a certificate update request and operable to obtain the updated digital certificate from the certificate authority based on the certificate update request; and
    wherein generating certification information at the endpoint further comprises:
    receiving a hash at the endpoint from the proxy function module;
    encrypting the hash; and
    transmitting the at least the portion of the certification information further comprises transmitting the encrypted hash as at least a portion of the at least the portion of the certification information.

2. The method of claim 1, wherein:
    the generating digitally signed information at the proxy function module comprises generating information signed with a private key of the proxy function module; and
    the authenticating the digitally signed information at the endpoint comprises verifying the digitally signed information against a certificate trust list.

3. The method of claim 1, wherein generating certification information at the endpoint further comprises:
    generating a private key; and
    generating a public key, the public key complementary to the private key.

4. The method of claim 1, further comprising: installing the digital certificate on the endpoint.

5. A method of establishing a digital certificate on an endpoint with a proxy function module, comprising:
    establishing a connection between the endpoint and the proxy function module, the proxy function module remotely located from the endpoint, and the proxy function module operable to communicate with the endpoint and a certificate authority, wherein the establishing the connection between the proxy function module and the endpoint further comprises authenticating the proxy function module by:
        generating digitally signed information at the proxy function module,
        communicating the digitally signed information to the endpoint, and
        authenticating the digitally signed information at the endpoint;
    receiving at least a portion of certification information at the proxy function module, the at least the portion of certification information generated at the endpoint;
    packaging the at least the portion of certification information in a certificate request;
    transmitting the certificate request to a certificate authority, the certificate authority reviewing the certificate request and issuing a digital certificate;
    receiving the digital certificate at the proxy function module;
    transmitting the digital certificate to the endpoint;
    receiving a request to obtain an updated digital certificate;
    packaging the at least the portion of certification information in a certificate update request; and
    obtaining the updated digital certificate from the certificate authority based on the certificate update request;
    transmitting a hash to the endpoint prior to receiving at least the portion of certification information, wherein receiving at least the portion of certification information further comprises:

receiving a public key generated by the endpoint;
receiving an encrypted hash, encrypted by a private key generated by the endpoint.

6. The method of claim 5, wherein transmitting the digital certificates to the endpoint further comprises:
verifying information on the digital certificate; and
transmitting the digital certificate to the endpoint only if the information is verified.

7. A system for establishing a digital certificate on an endpoint, the system comprising:
an endpoint, operable to:
authenticate a proxy function module by authenticating digitally signed information received from the proxy function module;
generate certification information; and
transmit at least a portion of the certification information to the proxy function module, and
the proxy function module in communication with the endpoint, the proxy function module comprises logic encoded in non-transitory media operable to:
generate digitally signed information at the proxy function module;
communicate the digitally signed information to the endpoint;
receive the at least the portion of the certification information;
package the at least the portion of the certification information in a certificate request;
transmit the certificate request to a certificate authority, the certificate authority reviewing the certificate request and issuing a digital certificate;
receive the digital certificate;
transmit the digital certificate to the endpoint;
receive a request to obtain an updated digital certificate;
package the at least the portion of certification information in a certificate update request; and
obtain the updated digital certificate from the certificate authority based on the certificate update request;
wherein the proxy function module is further operable to transmit a hash to the endpoint.

8. The system of claim 7, wherein logic encoded in media in the endpoint is further operable to:
encrypt the hash, and
transmit the encrypted hash as at least a portion of the at least the portion of the certification information.

9. The system of claim 7, wherein
the digitally signed information comprises information signed with a private key of the proxy function module; and
the logic encoded in media in the endpoint is further operable to authenticate the digitally signed information by verifying the digitally signed information against a certificate trust list.

10. The system of claim 7, wherein the logic encoded in media in the endpoint in the generation of the certification information is further operable to:
generate a private key; and
generate a public key, the public key complementary to the private key.

11. The system of claim 7, wherein the logic encoded in media in the proxy function module is further operable to:
verify information on the digital certificate and only transmit the digital certificate to the endpoint if the information is correct.

12. The system of claim 7, wherein the logic encoded in media in the proxy function module is further operable to:
install the digital certificate on the endpoint.

13. An endpoint comprising:
logic encoded in non-transitory media such that when executed is operable to:
establish a connection between a proxy function module and the endpoint, wherein the proxy function module is remotely located from the endpoint, and the proxy function module is operable to communicate with the endpoint and a certificate authority, the logic further operable to establish the connection by authenticating the proxy function module by authenticating, at the endpoint, digitally signed information received from the proxy function module;
generate certification information at the endpoint;
transmit at least a portion of the certification information to the proxy function module, the proxy function module operable to obtain a digital certificate from a certificate authority based on the at least the portion of the certification information; and
receive the digital certificate at the endpoint from the proxy function module.
transmit a request to the proxy function module to obtain an updated digital certificate, the proxy function module operable to obtain the updated digital certificate from the certificate authority based on the certificate update request;
wherein the logic encoded in media is further operable to:
encrypt a hash, and
transmit the encrypted hash as at least a portion of the at least the portion of the certification information.

14. The endpoint of claim 13, wherein the logic encoded in media is further operable to:
the digitally signed information comprises information signed with a private key of the proxy function module; and
the logic encoded in media in the endpoint is further operable to authenticate the digitally signed information by verifying the digitally signed information against a certificate trust list.

15. The endpoint of claim 13, wherein the logic encoded in media in the generation of the certification information is further operable to:
generate a private key; and
generate a public key, the public key complementary to the private key.

16. A proxy function module for establishing a digital certificate on an endpoint, the proxy function module comprising:
an interface operable to establish a connection between the endpoint and the proxy function module, the proxy function module remotely located from the endpoint, and the proxy function module operable to communicate with the endpoint and a certificate authority;
a processor operable to:
generate digitally signed information at the proxy function module;
communicate the digitally signed information to the endpoint for authentication of the proxy function module by the endpoint;
receive at least a portion of certification information at the proxy function module, the at least the portion of certification information generated at the endpoint;
package the at least the portion of certification information in a certificate request;
transmit the certificate request to a certificate authority, the certificate authority reviewing the certificate request and issuing a digital certificate;

receive the digital certificate at the proxy function module;
transmit the digital certificate to the endpoint;
receive a request to obtain an updated digital certificate;
package the at least the portion of certification information in a certificate update request; and
obtain the updated digital certificate from the certificate authority based on the certificate update request;
wherein the processor is further operable to:
transmit a hash to the endpoint prior to receiving at least the portion of certification information, wherein the processor in receipt of at least the portion of certification information is further operable to:
receive a public key generated by the endpoint; and
receive an encrypted hash, encrypted by a private key generated by the endpoint.

17. The proxy function module of claim 16, wherein the processor is further operable to transmit the digital certificates to the endpoint by:
verifying information on the digital certificate; and
transmitting the digital certificate to the endpoint only if the information is verified.

18. Logic encoded in non-transitory media such that when executed is operable to:
establish a connection between an endpoint and a proxy function module, wherein the proxy function module is remotely located from the endpoint, and the proxy function module is operable to communicate with the endpoint and a certificate authority, the logic further operable to establish the connection by communicating digitally signed information to the endpoint for authentication of the proxy function module by the endpoint;
receive at least a portion of certification information at the proxy function module, the at least the portion of certification information generated at the endpoint;
package the at least the portion of certification information in a certificate request;
transmit the certificate request to a certificate authority, the certificate authority reviewing the request and issuing a digital certificate;
receive the digital certificate at the proxy function module;
transmit the digital certificate to the endpoint;
receive a request to obtain an updated digital certificate;
package at least the portion of certification information in a certificate update request; and
obtain the updated digital certificate from the certificate authority based on the certificate update request;
wherein the logic encoded in media is further operable to:
transmit a hash to the endpoint prior to receipt of at least the portion of certification information, wherein the executed computer code in the receipt of the at least the portion of certification information is further operable to:
receive a public key generated by the endpoint; and
receive an encrypted hash, encrypted by a private key generated by the endpoint.

19. The logic of claim 18, wherein the logic encoded in media in the transmittal of the digital certificates to the endpoint is further operable to:
verify information on the digital certificate; and
transmit the digital certificate to the endpoint only if the information is verified.

20. A method of establishing a digital certificate on an endpoint, the method comprising:
establishing a connection with a proxy function module, wherein
the proxy function module is remotely located from the endpoint, and
the proxy function module is operable to communicate with the endpoint and a certificate authority;
receiving digitally signed information from the proxy function module;
authenticating the proxy function module by authenticating the digitally signed information at the endpoint;
generating a private key at the endpoint;
generating a public key at the endpoint, the public key complementary to the private key;
receiving a hash at the endpoint from the proxy function module;
encrypting the hash with the public key;
transmitting the encrypted hash and the public key to the proxy function module, the proxy function module operable to package the encrypted hash and the public key in a certificate request and operable to obtain a digital certificate from a certificate authority based on the certificate request;
receiving the digital certificate at the endpoint from the proxy function module; and
transmitting a request to the proxy function module to obtain an updated digital certificate, the proxy function module operable to package the at least the portion of certification information in a certificate update request and operable to obtain the updated digital certificate from the certificate authority based on the certificate update request;
encrypting a hash, and
transmitting the encrypted hash as at least a portion of the at least the portion of the certification information.

21. The method of claim 1, further comprising:
transmitting confirmation information from the endpoint to the proxy function module; and
storing the confirmation information in a database, the database being in communication with the proxy function module.

22. The method of claim 21, wherein the confirmation information identifies an expiration date of the digital certificate, the method further comprising:
generating a second request at the proxy function module at a predetermined time period relative to the expiration date of the digital certificate, the second request requesting that the endpoint seek a new digital certificate; and
communicating the second request to the endpoint.

* * * * *